United States Patent [19]

Smith

[11] 4,242,984
[45] Jan. 6, 1981

[54] COMBINATION CONTAINER AND FEEDER

[75] Inventor: Ernest L. Smith, Kansas City, Mo.

[73] Assignee: Phillips Petroleum Company, Bartlesville, Okla.

[21] Appl. No.: 904,663

[22] Filed: May 10, 1978

[51] Int. Cl.³ .............................................. A01K 39/00
[52] U.S. Cl. .................................. 119/52 R; 222/541
[58] Field of Search ............... 119/23, 26, 51 R, 52 R, 119/53; 229/17 B; 222/541; 221/302; 220/1 BC

[56] References Cited

U.S. PATENT DOCUMENTS

| | | | |
|---|---|---|---|
| 2,306,312 | 12/1942 | Hyde | 119/51 R |
| 2,683,440 | 7/1954 | Klix | 119/52 R |
| 2,705,938 | 4/1955 | Greenough | 119/52 R |
| 2,936,734 | 5/1960 | Chestnut, Jr. et al. | 119/52 R |
| 3,179,244 | 4/1965 | Kuhn | 119/52 R X |
| 3,244,150 | 4/1966 | Blair | 119/52 R |
| 3,354,868 | 11/1967 | Woodling | 119/52 R |
| 3,441,002 | 4/1969 | Lawalin et al. | 119/52 R |
| 3,459,328 | 8/1969 | Rowley | 206/620 X |
| 3,568,641 | 3/1971 | Kilham | 119/51 R |
| 3,945,528 | 3/1976 | Mowrey, Jr. | 229/7 R X |
| 4,098,745 | 7/1978 | Borman | 220/1 BC X |

Primary Examiner—Gene Mancene
Assistant Examiner—Robert P. Swiatek

[57] ABSTRACT

A container of the tubular side wall type has a bottom closure member and a top closure member. The side wall has a break line around a portion of the circumference thereof with an accurate scoreline extending between the opposite ends of the break line. When the container is to be used as a feeder, the break line is broken and a panel portion, defined by and between the score-line and the break line, is pushed inwardly to assume a concave shape. The panel portion is self-biased to the concave shape. A perch is provided such that when it is desired to use the container as a feeder, the perch can be inserted through the side wall so that a portion of the perch extends outwardly from the feeder at a position adjacent a feeding opening formed by pushing the panel portion inwardly. A hanger is provided to cooperate with an upper portion of the container for suspending the container in spaced relation to the ground.

24 Claims, 4 Drawing Figures

COMBINATION CONTAINER AND FEEDER

The present invention relates to a combination container/feeder and a blank from which the side wall of the container can be made.

Man has always had a desire to help birds and other animals through the hard times of the year by providing feed. At least two methods have been devised to fulfill this desire, one of which is casting feed on the ground and another is the use of a feeding device for dispensing feed therefrom. The use of elevated feeding devices provides numerous advantages over casting feed on the ground, particularly when it is birds that are being fed. The use of an elevated feeder provides birds a feeding place safe from predators and it can be positioned adjacent their normal habitat, i.e., suspended in a tree or the like. Many types of feeders have been developed in the past to accomplish feeding of animals and particularly birds.

One type of elevated feeder used is of the permanent installation type and is refillable. However, in recent years there has been a trend toward providing feeders which are disposable and which can be readily and easily converted from a container for storing and marketing the feed to a hanging feeder. However, several problems have been encountered with disposable feeders known in the art. Some of these problems are complicated structures and their attendant high price; structures which are not durable; feeders which require extensive assembly or partial assembly of a plurality of parts, etc. Another major problem with certain disposable feeders is that when the container is converted to a feeder, a portion of the container side wall is pushed inwardly into the container and held in that position as, for example, by locking tabs or frictional engagement between portions of the panel pushed inwardly and the remainder of the container, making them unreliable in use. The present invention overcomes the above difficulties by providing a container which is inexpensive to manufacture and simple and positive in operation.

An object of the present invention is to provide a container for the storing and marketing of animal feed which is easily convertible to a feeder. A further object of the present invention is to provide a combination container/feeder which can be made by standard container manufacturing machines without the necessity of expensive and/or extensive tooling changes. A still further object of the present invention is to provide a combination container/feeder which is well adapted for its intended use and inexpensive to manufacture. Another object of the present invention is to provide a blank for forming the side wall of a combination container/feeder.

Other objects and advantages of the present invention will become apparent from the following detailed description taken in connection with the accompanying drawings wherein are set forth by way of illustration and example certain embodiments of this invention.

Figure 1:
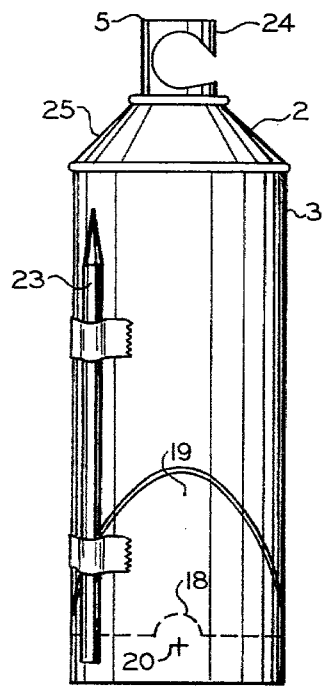
FIG. 1 is a front elevational view of a combination container/feeder in the container condition.

The reference numeral 1 designates generally a combination container/feeder which is comprised of a top member 2, tubular side wall 3 and a bottom closure 4. The container/feeder 1 is provided with hanging means 5 for suspending the container/feeder 1 in spaced relation to the ground. The container/feeder 1 hereinafter referred to as the container 1 also includes perch means 6 which is adapted for mounting on the container 1 when the container is used as a feeder.

Figure 3:
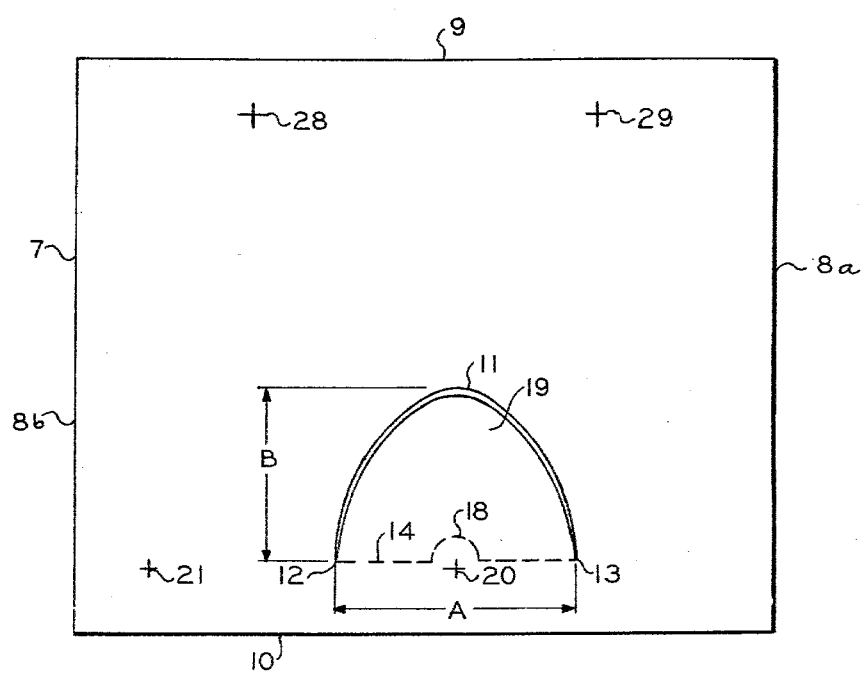
FIG. 3 is a plan view of a blank used for forming the side wall of the container/feeder of FIG. 1.

The side wall 3 can be either a generally cylindrical shape, which is preferred, or a frusto-conical or tapered side wall shape. Preferably, the cross-sections transverse to the longitudinal axis of the container 1 are generally circular. As best seen in FIG. 3, the side wall 3 is formed from a generally rectangular blank when the side wall 3 is generally cylindrically shaped. The side wall blank 7 has a main planar portion terminating at a plurality of peripheral edges including opposed side edges 8a and 8b and top and bottom edges 9 and 10, respectively. The corners between the side edges 8a and 8b and the bottom edge 10 can be perpendicular, rounded, or obliquely cut as is known in the art. The blank 7 has impressed therein, during manufacture, a scoreline 11 having ends 12 and 13. The scoreline 11 can be arcuate such as a portion of a circle, ellipse, parabola, hyperbola, etc. or can be a plurality of straight lines or relatively short straight lines connected together. A first break line 14 or weakened line of severance extends between the ends 12 and 13 terminating at the ends 12 and 13, respectively. The first break line 14, which can either be a perforate line or a knife scored line, facilitates converting of the container to a feeder by providing an opening 17 for access into the interior of the container when the break line 14 is severed. Preferably, the break line 14 is generally straight between the ends 12 and 13 and as illustrated has a tab portion 18 adjacent a mid point along the length of the break line 14 for a purpose later described. The scoreline 11 and break line 14 define a panel 19 therebetween.

The panel 19 can have other configurations than that shown such as triangular, parabolic, semicircular, etc. subject to certain limitations. The opening 17 provides an adequate opening for display of the feed to the bird and at the same time provides passage of the feed from the interior of the container into the display area. This can be provided if the straight length A of the break line 14 between points 12 and 13 in combination with the vertical dimension B between the center of the break line 14 and the maximum height of scoreline 11 permits the midpoint of the bottom edge of panel 11, severed along break line 14, to be pressed inwardly to a self-biased in position, preferably a distance in the range of about 25 to about 75 percent of the diameter of the container.

The break line 14 extends around the container between about 30 percent and about 50 percent of the circumference of the container side wall 3 and is generally parallel to the bottom edge of the container 1. It is to be noted that more than one panel 19 can be provided on a container 1. Also, on the blank 7, the distance between the ends 12 and 13 along an imaginary straight line drawn therebetween is between about 25 percent and about 50 percent of the width of the panel along an imaginary straight line colinear with the imaginary straight line between the ends 12 and 13.

Figure 2:
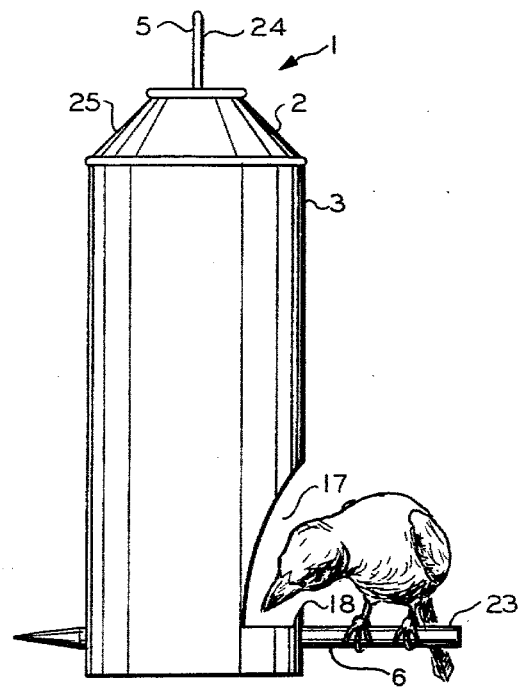
FIG. 2 is a side elevational view of the container/feeder of FIG. 1 in the feeder condition.

By having the length A of the break line 14 sized relative to the circumference of the container at the break line 14 and by having the maximum spacing B between the scoreline 11 and the midpoint of the imaginary line between ends 12 and 13 sized relative to the length A, when the panel 19 is pushed inwardly, assumes a concave shape, as best seen in FIG. 2, and is self-biased, due to the rigidity and resilience of the panel 19, to the concave position. Further, the panel 19 is also self-biased to its normal position or container side wall forming position.

When blank 7 is formed into a container, overlapping side marginal portions adjacent the edges 8a and 8b are secured together by heat sealing or by the addition of an adhesive as is known in the art to form the tubular side wall 3. The blank 7, in the illustrated structure, has a plurality of break lines which are used for mounting of the perch means 6 on the side wall 3. Second break lines 20 which preferably are in the form of a cross or +, are positioned adjacent the mid point of the break line 14 and preferably are positioned in or adjacent the tab 18. This permits mounting of the perch in a manner so that the upper edge of the perch is above the level of the break line 14. Third break lines 21, which can be similar to the break lines 20, are positioned about 180° on the side wall 3 from the break lines 20. On the blank 7, the break lines 21 are spaced from the break lines 20 approximately one-half of the distance separating the edges 8 and the break lines 20 and 21 are spaced approximately the same distance from the bottom edge 10.

The perch means 6 can be a dowel having one end sharpened to facilitate insertion of the dowel 23 through the break lines 20 and 21. The dowel 23 can be suitably attached to the side wall 3, as for example with tape, for storage and marketing of the container 1 or can be inserted into the interior of the container 1 and later removed for use.

Figure 4:
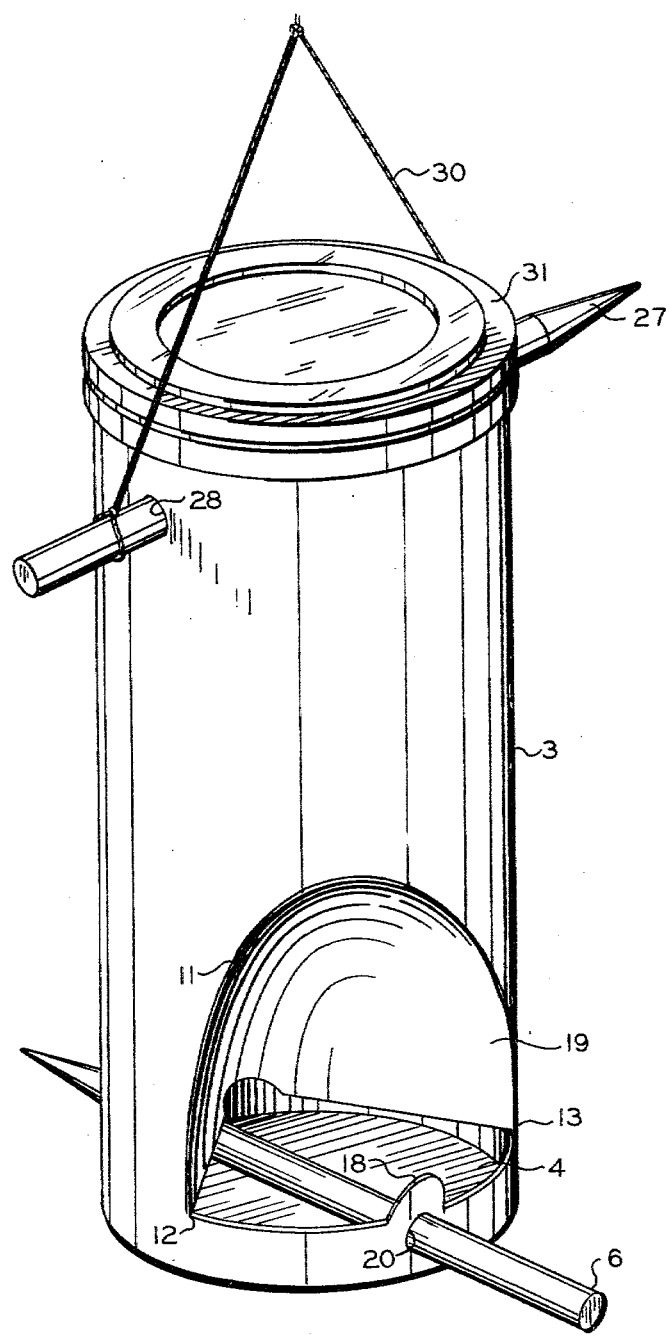
FIG. 4 is a perspective view of a modified form of the container/feeder.

FIG. 1 shows one form of hanging means while FIG. 4 shows a second form of hanging means and is one of the illustrated differences between the two forms of the invention shown in the figures. The hanging means 5 shown in FIG. 1 includes a hook member 24 which is connected to the container 1. The hook 24 can be an injection molded plastic part which is secured by any suitable means such as an adhesive, or crimped to a frusto conical top 25 which in turn is attached to the side wall 3. The top 25 can be a metal end or can be an injection molded plastic part. The means of securing the top 25 to the side wall 3 can be a top 25 crimped to the side wall 3 of a type well known in the art. The hanging means shown in FIG. 4 is a preferred embodiment and includes a dowel 27 similar to the dowel 23 which is sharpened on one end and can be either secured to the side wall 3 of the container 1 or inserted into the interior of the container for later removal. To use the dowel type hanger, break lines 28 and 29 similar to the break lines 20 and 21 are provided in the side wall 3 at a position approximately 90° from the break lines 20 and 21 and adjacent the top of the container 1. Fourth and fifth break lines 28 and 29 are illustrated in FIG. 3 and are positioned adjacent to and about the same distance from the upper edge 9 and are spaced apart about one-half the distance between the side edges 8. The break lines 28 and 29 would not be needed in the blank 7 when the hanger of FIG. 1 is used.

When using the dowel hanger 27 a string 30 or the like is provided with loops on opposite ends thereof for receiving the dowel 27 therethrough. The string 30 is then hooked over a limb of a tree or the like for suspending the container 1 in spaced relation to the ground. A suitable top closure 31, as is known in the art, can be used to close the upper end of the container 1. The top closure 31 can be a plastic overcap for recovering the container 1 after a removable diaphragm seal or a metal end has been removed to obtain the perch 6 and dowel hanger 27 from the inside of the container in the event the dowels 23 and 27 are inside the container 1.

The present invention will be more clearly understood by a description of the operation thereof. In both forms of the invention shown, the container 1 with the panel 19 in its normal position and the break line 14 unsevered, is marketed in that condition and is substantially full of bird seed or the like. When it is desired to use the container 1, the panel 19 has force applied thereto adjacent the break line 14 to sever the break line 14, and the panel 19 is pushed inwardly to assume a concave shape. The resilient rigidity of the panel 19 self-biases the panel 19 to its concave in position. The scoreline 11 limits that portion of the side wall 3 which will be the panel 19 and thereby assume the concave in shape. The feed contained in the container will be exposed through the opening 17 and is available for feeding through the opening 17. A bird will perch on the end of the dowel 23 and feed through the opening 17. The container 1 is suspended in spaced relation to the ground from a limb of a tree or the like by use of either the string 30 or the hook 24.

It is to be understood that while there has been illustrated and described certain forms of the present invention, it is not to be limited to the specific form or arrangment of parts herein described and shown except to the extent that such limitations or their equivalents are found in the claims.

What is claimed and desired to be secured by Letters Patent:

1. A combination container and feeder comprising:
   a tubular side wall having a top end and a bottom end and a generally circumferentially extending first break line adjacent to and spaced from said bottom end and extending partially around said side wall and having first and second ends, said side wall having at least one generally arcuate scoreline extending from said first end toward said top end and then to said second end, said first break line and said at least one scoreline defining an invertible panel therebetween;
   a bottom member secured to said bottom end and forming a container bottom; and
   a top member cooperating with said side wall at said top end and forming a container top.

2. A combination container and feeder as set forth in claim 1 wherein:
   said first break line extends around said side wall a distance sufficient whereby when the first break line is broken and said panel is pushed inwardly into the interior of the container the resilient self bias of the panel holding the panel in its normal position is overcome and the panel is self biased in a concave position in the interior of the container; and
   said scoreline is generally arcuate.

3. A combination container and feeder as set forth in claim 2 wherein:
   the midpoint of the first break line extends into the container a distance in the range of between about 25 percent and about 75 percent of the container diameter at the first break line when the panel is in the concave in position.

4. A combination container and feeder as set forth in claim 2 wherein:
said panel being in a concave position forms a feeding opening in the side wall.

5. A combination container and feeder as set forth in claim 4 including:
hanging means for suspending the feeder in spaced relation to the ground.

6. A combination container and feeder as set forth in claim 5 including:
perch means for supporting a feeding animal.

7. A combination container and feeder as set forth in claim 6 wherein:
said first break line has a length in the range of about 30 percent to about 50 percent of the circumference of the side wall at the break line.

8. A combination container and feeder as set forth in claim 7 wherein:
the midpoint of the first break line on said panel extends into the container a distance in the range of about 25 percent to about 75 percent of the container diameter at the first break line when the panel is in the concave position.

9. A combination container and feeder as set forth in claim 8 including:
a second break line in said side wall at a position adjacent the middle of said first break line and a third break line in said side wall at a position about 180° around the side wall from the second break line.

10. A combination container and feeder as set forth in claim 9 wherein:
said perch means includes a first rigid member extending through openings in the sidewall formed at said second and third break lines.

11. A combination container and feeder as set forth in claim 10 wherein:
said hanging means includes a hook mounted on an upper end of said side wall.

12. A combination container and feeder as set forth in claim 9 wherein:
said tubular side wall has a fourth break line adjacent the top edge thereof and a fifth break line in said tubular side wall at a position about 180° around the side wall from said fourth break line;
a second rigid member extends through openings formed in said tubular side wall at said fourth and fifth break lines; and
suspending means are attached to said second rigid member to suspend the feeder in spaced relationship to the ground.

13. A combination container and feeder as set forth in claim 4 wherein:
said first break line is a perforate line;
said top member is a plastic part crimped to said tubular side wall; and
a hook is secured to said top member to suspend the feeder in spaced relationship to the ground.

14. A combination container and feeder as set forth in claims 1 or 11 wherein:
said first break line is a perforate line.

15. A combination container and feeder as in claim 1 wherein said generally arcuate scoreline has a shape selected from the group consisting of portions of a circle, ellipse, parabola, and hyperbola.

16. A blank for forming a side wall of a combination container and feeder, said blank including:
a panel of semi-rigid material, said panel having a plurality of peripheral edges and a main planar portion, said main planar portion having a first break line with first and second ends and having a generally arcuate scoreline extending from said first end toward at least one edge and then to said second end, said break line and said scoreline defining a panel therebetween, the distance between said first and second ends being in the range of about 25 percent to about 50 percent of the width of the panel along an imaginary straight line through said first and second ends.

17. A blank as set forth in claim 10 wherein:
said panel is generally rectangularly shaped having first and second side edges, a top edge and a bottom edge.

18. A blank as set forth in claim 17 including:
a second break line in said panel at a position adjacent a midpoint of said first break line and a third break line in said panel spaced from said second break line about one-half the distance between the first and second side edges and being positioned at about the same distance from the bottom edge as the second break line.

19. A blank as set forth in claim 18 wherein:
said first break line has an arcuate portion adjacent a central portion of the first break line, said arcuate portion defining a tab extending from a straight portion of the first break line.

20. A blank as set forth in claim 19 wherein:
said second break line is adjacent said tab.

21. A blank as set forth in claim 20 including:
a fourth break line in said panel at a position adjacent the top edge and a fifth break line in said panel at a position about the same distance from the top edge as the fourth break line and spaced from the fourth break line a distance of about one-half of the spacing between the side edges.

22. A combination container and feeder comprising:
a tubular side wall having a top end and a bottom end and a generally circumferentially extending first break line adjacent to and spaced from said bottom end and extending partially around said side wall and having first and second ends, said side wall having at least one scoreline extending from said first end toward said top end and then to said second end, said first break line and said at least one scoreline defining a panel therebetween;
a bottom member secured to said bottom end and forming a container bottom;
a top member cooperating with said side wall at said top end and forming a container top; and wherein said first break line extends around said side wall a distance sufficient whereby when the first break line is broken and said panel is pushed inwardly into the interior of the container the resilient self bias of the panel holding the panel in its normal position is overcome and the panel is self biased in a concave position in the interior of the container;
said scoreline is generally arcuate;
said tubular side wall has a second break line at a position adjacent the middle of said first break line and a third break line at a position about 180° around said tubular side wall from the second break line;
a first rigid member extends through the openings formed in said tubular side wall at said second and third break lines;

said tubular side wall has a fourth break line adjacent the top edge thereof and a fifth break line in said tubular side wall at a position about 180° around the side wall from said fourth break line;

a second rigid member extends through openings formed in said tubular side wall at said fourth and fifth break lines; and suspending means are attached to said second rigid member to suspend the feeder in spaced relationship to the ground.

23. A combination container and feeder as set forth in claim 22 wherein:

said top member comprises a plastic overcap for recovering said container after a removable seal has been removed.

24. A blank for forming a side wall of a combination container and feeder, said blank including:

a panel of semi-rigid material, said panel being generally rectangularly shaped having first and second side edges, a top edge and a bottom edge and having a main planar portion, said main planar portion having a first break line with first and second ends and having a generally arcuate scoreline extending from said first end toward the top edge and then to said second end, said break line and said scoreline defining a panel therebetween, the distance between said first and second ends being in the range of about 25 percent to about 50 percent of the width of the panel along an imaginary straight line through said first and second ends;

a second break line in said panel at a position adjacent a midpoint of said first break line and a third break line in said panel spaced from said second break line about one-half the distance between the first and second side edges and being positioned at about the same distance from the bottom edge as the second break line; and a fourth break line in said panel at a position adjacent the top edge and a fifth break line in said panel at a position about the same distance from the top edge as the fourth break line and spaced from the fourth break line a distance of about one-half of the spacing between the side edges.

* * * * *

UNITED STATES PATENT AND TRADEMARK OFFICE
CERTIFICATE OF CORRECTION

PATENT NO. : 4,242,984

DATED : January 6, 1981

INVENTOR(S) : Ernest L. Smith

It is certified that error appears in the above-identified patent and that said Letters Patent are hereby corrected as shown below:

Column 6, line 13, "10" should read --- 16 ---.

*Signed and Sealed this*

*Twenty-first* Day of *April 1981*

[SEAL]

*Attest:*

RENE D. TEGTMEYER

*Attesting Officer*      *Acting Commissioner of Patents and Trademarks*